June 18, 1940.  W. H. BENNETT  2,204,564
RECTIFIER
Filed April 8, 1939   2 Sheets-Sheet 1
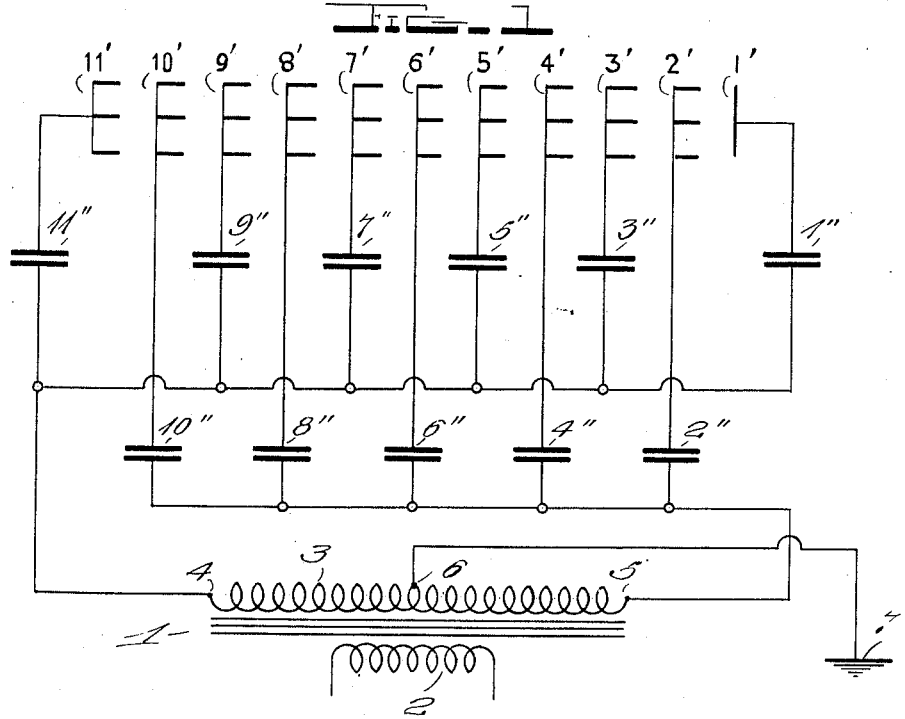
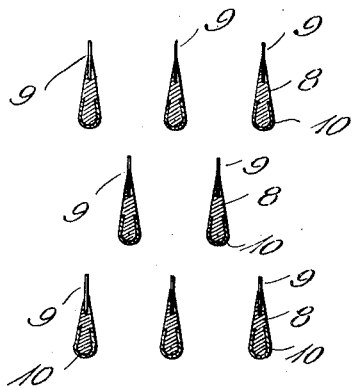
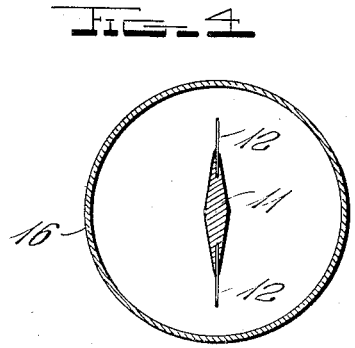
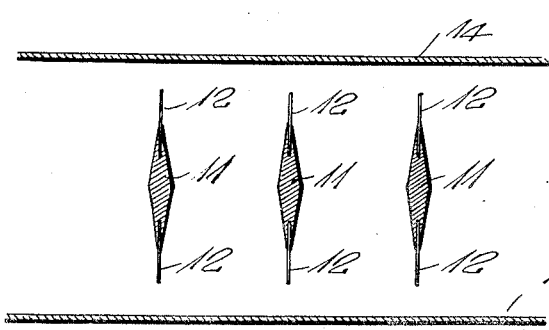
INVENTOR.
Willard H. Bennett,
BY John C. Brady
ATTORNEY.

June 18, 1940.  W. H. BENNETT  2,204,564
RECTIFIER
Filed April 8, 1939  2 Sheets-Sheet 2
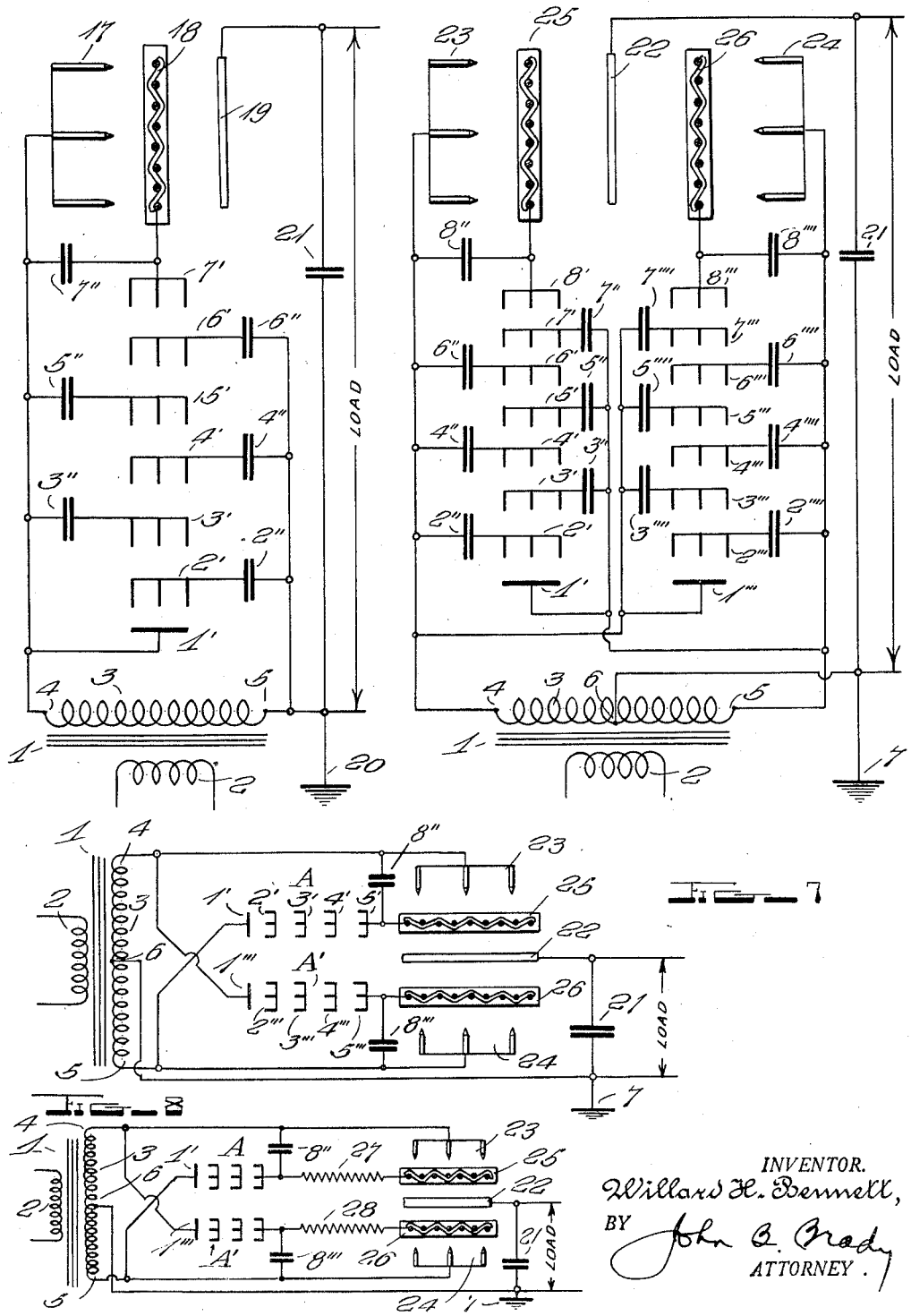
INVENTOR.
Willard H. Bennett,
BY John B. Brady
ATTORNEY.

Patented June 18, 1940

2,204,564

UNITED STATES PATENT OFFICE 2,204,564

RECTIFIER

Willard H. Bennett, Newark, Ohio, assignor to Electronic Research Corporation, Newark, Ohio, a corporation of Ohio Application April 8, 1939, Serial No. 266,848

17 Claims. (Cl. 175—363)

My invention relates broadly to high voltage rectifiers and more particularly to an arrangement of full wave rectifier employing electric emission from points for rectifying alternating current.

One of the objects of my invention is to provide a circuit arrangement for a high voltage rectifier system of the electric emission point-to-plate type including auxiliary point-to-point rectifiers for establishing proper bias components for insuring proper operation of the high voltage rectifier.

Another object of my invention is to provide a circuit arrangement for a full wave high voltage rectifier of the electric emission type having means for controlling the efficient operation of the rectifier and having auxiliary rectifier assemblies associated with the high voltage rectifier for impressing required controlling potentials on the control element of the high voltage rectifier.

Still another object of my invention is to provide a circuit arrangement for a high voltage full wave rectifier of the electric emission type adapted for operation with a centrally tapped input transformer having auxiliary rectifier assemblies connected in circuit with certain of the electrodes of the high voltage rectifier for impressing suitable bias potential thereon.

A further object of my invention is to provide a circuit arrangement for a full wave high voltage rectifier including a target member and pairs of coacting electric emitters and control electrodes with means for impressing alternating current upon the electrodes while passing a portion of the impressed alternating current through auxiliary rectifier assemblies individual to the control electrodes for establishing a suitable biasing potential for insuring operation of the high voltage rectifier.

Other and further objects of my invention reside in a circuit arrangement for high voltage rectifier systems as set forth more fully in the specification hereinafter following by reference to the accompanying drawings, in which:

Figure 1 diagrammatically illustrates a high voltage rectifier system constructed in accordance with my invention; Fig. 2 schematically shows the arrangement of electrodes having emitting portions and target portions for connection in the circuit of Fig. 1; Fig. 3 illustrates one arrangement of emitters and target electrodes which may be employed in the rectifier system of my invention; Fig. 4 shows a modified form of electrode arrangement which may be employed in the rectifier system of my invention; Fig. 5 illustrates a circuit arrangement for a high voltage rectifier system embodying my invention and showing the manner in which a suitable biasing component may be secured from an auxiliary rectifying system for impression upon the control electrode of the high voltage rectifier; Fig. 6 diagrammatically shows a full wave high voltage rectifier system embodying my invention; Fig. 7 illustrates a simplified form of full wave rectifier system embodying my invention; and Fig. 8 illustrates a circuit arrangement for improving the efficiency of operation of a high voltage rectifier constructed in accordance with my invention.

My invention is directed to a high voltage rectifier system for obtaining direct current from a high voltage supply without the necessity of employing any rotating machinery or vacuum tubes. I employ a main rectifier of the electric emission type which includes an emitter, a target and a control electrode. I provide an auxiliary rectifier by which a biasing component is derived from the impressed alternating current power source and applied to the control electrode of the main rectifier. I also provide a circuit arrangement adaptable to a full wave rectification system in which a pair of electric emission assemblies, each including an emitter, a control electrode and a common target are arranged in such manner as to receive an auxiliary biasing component from electric emitter assemblies derived from the full input voltage of the rectifier system. I also provide means for eliminating excessive current in the control electrode circuits of a rectifier system by impeding the flow of current in the control electrode circuit until the target has acquired sufficient voltage to draw practically all of the current away from the control electrodes. I employ the self rectification obtainable in auxiliary electric emitter assemblies for deriving the required bias potential for application to the control electrode of the main rectifier assemblies. Both the main rectifier electrode assemblies and the auxiliary rectifier electrode assemblies operate at substantially atmospheric pressures.

Referring to the drawings in detail, the self rectifying circuit by which the biasing components are secured for energizing the control electrodes of the main rectifier assembly has been illustrated schematically in Fig. 1 in which input transformer 1 has the primary winding 2 thereof connected to the high potential source to be rectified. The secondary winding 3 is coupled with primary winding 2 and has the end 4 thereof connected to alternate electric emitters 3′, 5′, 7', 9' and 11' and target 1' through condensers 3'', 5'', 7'', 9'' and 11'' as shown and through condenser 1'' as shown. The opposite end 5 of the secondary winding 3 is connected to the intermediate electric emitters 2', 4', 6', 8' and 10' through condensers 2'', 4'', 6'', 8'' and 10'' as shown. The center tap of secondary winding 3 of transformer 1 indicated at 6 is connected to ground shown at 7. The self rectifying auxiliary rectifier system constituted by the electric emitters 2'—11' coacting with target 1' may take a variety of forms.

The rectifier of Fig. 1 is self rectifying by virtue of the point to plate discharge characteristic of the device which is evident in each stage of the system 1'—11'; that is, emitters 11' and a portion of emitters 10', serving as target, form one stage of the rectifier which has the same characteristics as every other stage. The condenser 11'' connected with the initial discharge group 11' and condenser 1'' connected with the last target element 1' are in series across the whole of the electrode assembly, and the voltage across these condensers in combination, or across one of them, is the rectified output of the system. The condensers 3'', 5'', 7'' and 9'', connected to intermediate electrodes 3', 5', 7' and 9', are essentially blocking condensers for preventing discharge of the condensers 1'' and 11'' through the intermediate stages of the rectifier. Similar considerations appertain to the alternate electrodes 2', 4', 6', 8' and 10', and the condensers connected therewith, the intermediate condensers 4'', 6'', 8'', serving as blocking condensers, and condensers 2'' and 10'' as possible output units; the voltage across condensers 2'' and 10'', however, is less than that across condensers 1'' and 11'' which receive the full rectified voltage of all the stages in the system.

In Fig. 2 I have shown a group of electrodes disposed in off-set relation in which emitting portions of one row of electrodes coact with target portions of an adjacent row of electrodes. Each electrode may be formed from semi-conductive plastic material 8 which supports sets of emitters in one end indicated at 9 and is provided with a target 10 at the opposite end. High potential discharge takes place between the emitting portions 9 of one row of electrodes and the target portion 10 of an adjacent row of electrodes and electric circuit connections provided as set forth in Fig. 1 for deriving uni-directional current which may be impressed upon the control electrode of the main rectifier system.

The auxiliary rectifier may be constituted by a double ended emitting electrode of the kind illustrated in Fig. 3 in which the semi-conducting mass 11 supports rows of discharge points 12 which extend in opposite directions to the target electrodes 14 and 15. The self rectification obtained between discharge electrodes 12 and target electrodes 14 and 15 develops a biasing component which may be applied to a main rectifier in carrying out the system of my invention.

The auxiliary biasing component may be obtained by enclosing a double ended emitting electrode of the type shown in Fig. 3 in an arrangement such as illustrated in Fig. 4 in which an auxiliary anode or target 16 encloses the double ended emitting electrode and the emitters fire in diametrically opposite directions toward the interior walls of the tubular anode or target. The self rectification obtained between the discharge points and the target or anode is utilized to impress the desired biasing component on the main rectifier circuits of my invention illustrated generally in Figs. 5–8.

Fig. 5 shows a main rectifier in association with the auxiliary rectifier assembly of the type illustrated in Figs. 1-4 where the main rectifier is constituted by emitters 17, control electrode 18 and target 19. The alternating current input circuit is the same input circuit heretofore described for the auxiliary rectifier assembly, that is, transformer 1 having primary winding 2 and the secondary winding 3. The terminal 4 of secondary winding 3 connects to the emitters 17 of the main rectifier. The terminal 5 of secondary winding 3 connects to control electrode 18 through a path which contains alternate emitters of the auxiliary rectifier assembly, that is, emitters 2', 4' and 6' through condensers 2'', 4'' and 6''. Terminal 4 of secondary winding 3 also connects to the alternate emitters of the auxiliary rectifier assembly, that is, 3', 5' and 7' through condensers 3'', 5'' and 7'' as shown. The target 1' of the auxiliary rectifier assembly connects to terminal 4 of secondary winding 3. The full input voltage is accordingly effectively applied to the auxiliary rectifier assembly thereby developing a biasing component which is impressed upon control electrode 18 of the main rectifier. The output circuit connects between terminal 5 of secondary winding 3 grounded at 20 and the target 19. Suitable filters represented generally by condenser 21 may be associated with the output system for smoothing the rectified current.

In Fig. 6 I have illustrated a full wave rectifier embodying my invention in which a common target 22 is associated with sets of electric emitters 23 and 24 directed toward the target with control electrodes 25 and 26 disposed intermediate the emitters 23 and target electrode 22 and intermediate the emitters 24 and target electrode 22, respectively. The alternating current input system to the full wave rectifier is similar to the arrangement described in Figs. 1 and 5, that is, an input transformer 1 has primary winding 2 connected with the alternating current supply to be rectified with secondary winding 3 associated therewith and connected at terminal 4 with electric emitters 23 of the main rectifier and connected at terminal 5 with electric emitters 24 of the main rectifier. The biasing component for control electrode 25 is secured from an auxiliary rectifier assembly similar to that disclosed in Figs. 1 and 5. In the full wave rectifier arrangement, alternately disposed emitters 3', 5' and 7' are connected through condensers 3'', 5'' and 7'' with terminal 5 of secondary winding 3. The alternately disposed emitters 2', 4', 6' and 8' are connected through condensers 2'', 4'', 6'' and 8'' with terminal 4 of secondary winding 3. The associated target 1' is connected to terminal 5 of winding 3. Thus the entire secondary voltage is applied across the auxiliary rectifier assembly and bias potential is impressed upon control electrode 25 for operating electrode assembly 23, 25 and 22 as a rectifier.

Control electrode 26 has bias potential applied thereto by operation of an auxiliary rectifier assembly similar in arrangement to the auxiliary rectifier assemblies heretofore described. That is to say, electric emitters 2''', 4''', 6''' and 8''' are connected through condensers 2'''', 4'''', 6'''' and 8'''' to terminal 5 of secondary winding 3. The alternate electric emitters 3''', 5''' and 7''' are connected through condensers 3'''', 5'''' and 7'''' to terminal 4 of secondary winding 3. Target electrode 1''' is connected to terminal 4 of secondary winding 3 as indicated. The alternate emitters of each auxiliary rectifier assembly operate in accordance with cyclic change of the impressed alternating current and insure a smooth uni-directional potential upon the control electrodes of the main rectifier. The output circuit of the full wave rectifier extends between target 22 and the center tap 6 of secondary winding 3 of transformer 1. The center tap 6 may be grounded as indicated at 7 and as described in connection with Fig. 1.

In Fig. 7 I have shown a full wave rectifier constructed in accordance with my invention in which the biasing components are derived by emitter and target assemblies A and A' for the control electrodes 25 and 26, respectively, of the main full wave rectifier. The auxiliary rectifier assembly A comprises target 1' and emitters 2', 3', 4' and 5' across which the entire voltage of secondary winding 3 is impressed for securing the biasing potential for control electrode 25. The biasing potential for control electrode 26 is obtained from auxiliary rectifier A' constituted by target 1''', and associated emitters 2''', 3''', 4''', and 5''' across which the entire voltage of secondary winding 3 is impressed for securing the biasing component for control electrode 26. In this arrangement only a single condenser 8'' and 8''' is employed in association with each rectifier assembly. The auxiliary components give a higher bias voltage than could be obtained on a half wave rectifier operating from a transformer whose secondary is grounded at one end.

One of the characteristics of this type of rectifier is the relatively large current which exists in the control electrode circuit just after the emitters 23, 24 begin firing but before the target 22 has risen to an important excess voltage above the bias voltage of the control electrodes 25, 26. During this interval of time while the target 22 is acquiring sufficient voltage from the emitters 23, 24 to draw practically all of the current past the control electrode, there is not a very large useful target current. The waste which this control electrode current represents can be eliminated largely by use of the resistances 27 and 28 as shown in Fig. 8. These resistances 27 and 28 effectively cut off this control electrode current because of the potential drop in the resistances themselves until the target 22 has acquired sufficient voltage to draw practicaly all of the current away from the control electrodes. The resistances 27 and 28 are interposed between the auxiliary rectifier assemblies A and A' and control electrodes 25 and 26.

I have described my invention in certain preferred embodiments, but I realize that modifications may be made in the circuit arrangements of my invention and I desire no limitations upon my invention other than may be imposed by the scope of the appended claims.

What I claim as new and desire to secure by Letters Patent of the United States is as follows:

1. A rectifier comprising in combination an electric emitter, a target coacting with the electric emitter, a control electrode disposed adjacent the electric emitter and the target, an input circuit for supplying alternating current to be rectified, an output circuit connected with said target for deriving rectified current, and an assembly of electrodes comprising an auxiliary target and coacting electric emitters connected in shunt with said input circuit for deriving rectified current therefrom and applying a bias potential on said control electrode for suppressing alternate phases of the emission from the first said emitter.

2. A rectifier comprising an alternating current input circuit, a direct current output circuit, a main rectifier assembly constituted by electric emitters and a coacting target, a control electrode, an auxiliary rectifier assembly including an auxiliary target and a plurality of coacting electric emitters, said auxiliary target and said plurality of electric emitters being connected in a path effectively in shunt with said input circuit for deriving rectified current from said input circuit and establishing a selected bias potential for said control electrode for suppressing alternate phases of the emission from the first said electric emitters.

3. A rectifier system comprising an alternating current input circuit, an output circuit for delivering rectified alternating current, an electrode assembly comprising an electric emitter, a coacting target electrode and a control electrode disposed adjacent thereto, circuits for impressing alternating current from said input circuit across said output circuit in series with said emitter and said target electrode, an auxiliary electrode assembly comprising an auxiliary target and a multiplicity of coacting electric emitters, said auxiliary electrode assembly being effectively in shunt with said input circuit for deriving rectified current therefrom, and a connection from one of the electrodes in said auxiliary electrode assembly for impressing selected bias potential upon said control electrode for suppressing alternate phases of the emission from the first said electric emitter.

4. A rectifier system comprising an alternating current input circuit, an output circuit for delivering rectified alternating current, an electrode assembly comprising an electric emitter, a coacting target electrode and a control electrode disposed adjacent thereto, circuits for impressing alternating current from said input circuit across said output circuit in series with said emitter and said target electrode, an auxiliary electrode assembly comprising an auxiliary target and a multiplicity of coacting electric emitters, said auxiliary electrode assembly being energized from said input circuit for developing rectified current, and a connection from one of the electrodes in said auxiliary electrode assembly for impressing a selected potential upon said control electrode.

5. A rectifier system comprising an alternating current input circuit, an output circuit for delivering rectified alternating current, an electrode assembly comprising an electric emitter, a coacting target electrode and a control electrode disposed adjacent thereto, circuits for impressing alternating current from said input circuit across said output circuit in series with said emitter and said target electrode, an auxiliary electrode assembly comprising an auxiliary target and a multiplicity of coacting electric emitters, said auxiliary electrode assembly being connected in circuit with said input circuit for deriving rectified current therefrom, connections from alternately disposed coacting electric emitters in said auxiliary electrode assembly with opposite sides of said input circuit, a connection from said auxiliary target to one side of said input circuit, and a connection from one of the coacting electric emitters in said auxiliary electrode assembly with the control electrode of said first mentioned electrode assembly.

6. A rectifier system comprising an alternating current input circuit, an output circuit for delivering rectified alternating current, an electrode assembly comprising an electric emitter, a coacting target electrode and a control electrode disposed adjacent thereto, circuits for impressing alternating current from said input circuit across said output circuit in series with said emittter and said target electrode, an auxiliary electrode assembly comprising an auxiliary target and a multiplicity of coacting electric emitters, a like multiplicity of condensers, said auxiliary electrode assembly having the alternately disposed coacting electric emitters connected through said condensers with opposite sides of said input circuit, a connection from said auxiliary target to one side of said input circuit, and a connection from one of the coacting electric emitters in said auxiliary electrode assembly to the control electrode of said first mentioned electrode assembly for impressing a selected potential upon said control electrode.

7. A rectifier comprising an electrode assembly constituted by separate sets of electric emitters directed toward each other, a common target disposed between said electric emitters, a control electrode disposed adjacent one side of said common target and one set of said electric emitters, another control electrode disposed adjacent the opposite side of said common target and the other set of said electric emitters, an input circuit, a source of alternating current connected with said input circuit, connections from opposite sides of said input circuit with said separate sets of electric emitters, an output circuit for rectified energy connected with said common target, and independent electrode assemblies connected across said input circuit for developing rectified current therefrom, and independently impressing selected bias potentials upon each of said control electrodes for suppressing alternate phases of the emission respectively from said sets of electric emitters.

8. A rectifier comprising an electrode assembly constituted by separate sets of electric emitters directed toward each other, a common target disposed between said electric emitters, a control electrode disposed adjacent one side of said common target and one set of said electric emitters, another control electrode disposed adjacent the opposite side of said common target and the other set of said electric emitters, an input circuit, a source of alternating current connected with said input circuit, connections from opposite sides of said input circuit with said separate sets of electric emitters, an output circuit for rectified energy connected with said common target, and independent electrode assemblies forming separate paths between a point in said input circuit and one of said control electrodes for deriving a bias potential from said input circuit and impressing the said bias potential upon the associated control electrode.

9. A rectifier comprising an electrode assembly constituted by separate sets of electric emitters directed toward each other, a common target disposed between said electric emitters, a control electrode disposed adjacent one side of said common target and one set of said electric emitters, another control electrode disposed adjacent the opposite side of said common target and the other set of said electric emitters, an input circuit, a source of alternating current connected with said input circuit, connections from opposite sides of said input circuit with said separate sets of electric emitters, an output circuit for rectified energy connected with said common target, independent electrode assemblies each comprising a multiplicity of auxiliary electric emitters and an auxiliary target, the auxiliary targets of the electrode assemblies being connected to opposite points of said input circuit, and independent connections from the auxiliary electric emitters in said electrode assemblies to said control electrodes respectively for impressing bias potentials on the said control electrodes.

10. A rectifier comprising an electrode assembly constituted by separate sets of electric emitters directed toward each other, a common target disposed between said electric emitters, a control electrode disposed adjacent one side of said common target and one set of said electric emitters, another control electrode disposed adjacent the opposite side of said common target and the other set of said electric emitters, an input circuit, a source of alternating current connected with said input circuit, connections from opposite sides of said input circuit with said separate sets of electric emitters, an output circuit for rectified energy connected with said common target, independent electrode assemblies each comprising an auxiliary target electrode and a multiplicity of auxiliary electric emitters, connections from opposite sides of said input circuit to said auxiliary targets, connections from certain of said auxiliary electric emitters respectively to the said control electrodes, and a condenser connected in shunt with each control electrode and its associated set of electric emitters.

11. A rectifier comprising an electrode assembly constituted by separate sets of electric emitters directed toward each other, a common target disposed between said electric emitters, a control electrode disposed adjacent one side of said common target and one set of said electric emitters, another control electrode disposed adjacent the opposite side of said common target and the other set of said electric emitters, an input circuit, a source of alternating current connected with said input circuit, connections from opposite sides of said input circuit with said separate sets of electric emitters, an output circuit for rectified energy connected with said common target, independent electrode assemblies comprising auxiliary target electrodes and a multiplicity of auxiliary electric emitters, said auxiliary target electrodes being individually connected to opposite sides of said input circuit and selected auxiliary electric emitters in the said independent electrode assemblies having individual connections to said control electrodes, and resistors interposed in said last mentioned connections.

12. A rectifier comprising an electrode assembly constituted by separate sets of electric emitters directed toward each other, a common target disposed between said electric emitters, a control electrode disposed adjacent one side of said common target and one set of said electric emitters, another control electrode disposed adjacent the opposite side of said common target and the other set of said electric emitters, an input circuit, a source of alternating current connected with said input circuit, connections from opposite sides of said input circuit with said separate sets of electric emitters, an output circuit for rectified energy connected with said common target, independent electrode assemblies comprising auxiliary target electrodes and a multiplicity of auxiliary electric emitters, said auxiliary target electrodes being individually connected to opposite sides of said input circuit and selected auxiliary electric emitters in the said independent electrode assemblies having individual connections to said control electrodes, and means in said last mentioned connections for impeding the control electrode current until said first mentioned target has acquired sufficient voltage to draw practically all of the current away from the control electrodes.

13. A rectifier comprising an odd number of coacting electric discharge and target electrodes, a source of alternating current, a first of said electrodes being constituted solely as a discharge electrode and connected to one terminal of said source, alternate succeeding electrodes being connected to the same terminal of said source, the last of said electrodes being constituted solely as a target electrode, the remaining alternate electrodes being connected to the opposite terminal of said source, and condensers individual to the connections to each of said electrodes, with rectified voltage being produced across the condensers connected with the said first and the said last of said electrodes.

14. A rectifier comprising a plurality of coacting electrodes, a source of alternating current, the first of said electrodes being constituted solely as a discharge electrode and the last of said electrodes being constituted solely as a target electrode, intermediate electrodes being constituted as both target and discharge electrodes, connections from alternate electrodes to one terminal of said source and connections from the remaining alternate electrodes to the other terminal of said source, a condenser in the connection to the said first of said electrodes for deriving rectified voltage thereacross, and means in the connections to said intermediate electrodes for preventing discharge of said condenser through said intermediate electrodes.

15. A rectifier as set forth in claim 14 including an odd number of said electrodes, with the said last of the electrodes connected with the same terminal of the source of alternating current as the said first of the electrodes, and a condenser in circuit with the said last of the electrodes for deriving rectified voltage thereacross, said means being operative also to prevent discharge of the last said condenser through said intermediate electrodes.

16. A rectifier as set forth in claim 14 including an odd number of said electrodes, with the said last of the electrodes connected with the same terminal of the source of alternating current as the said first of the electrodes.

17. A rectifier as set forth in claim 14 including an even plurality of said electrodes, with the said last of the electrodes connected with the opposite terminal of the source of alternating current from the connection of the said first of the electrodes.

WILLARD H. BENNETT.